Figure 1:
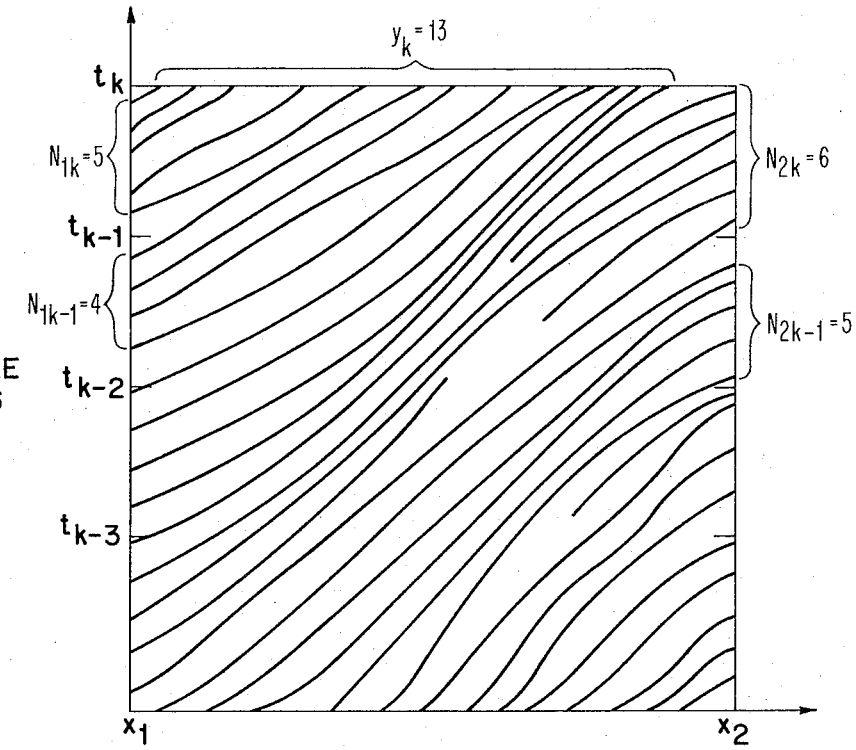
Figure 2:
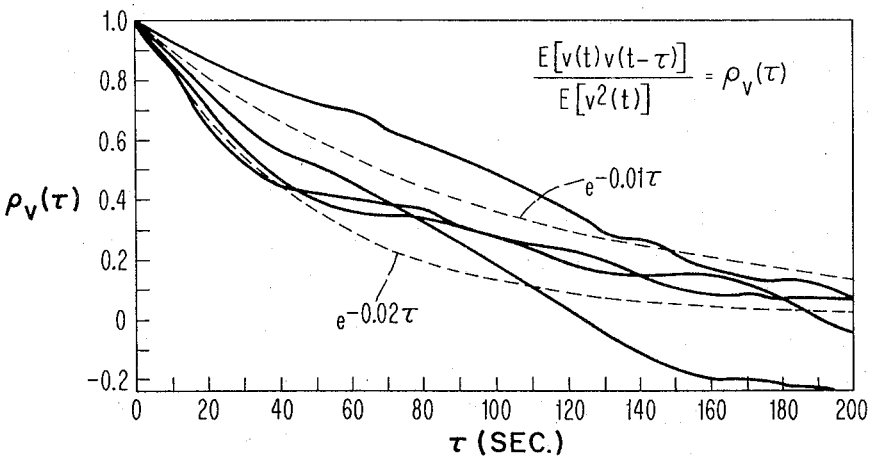
Figure 3:
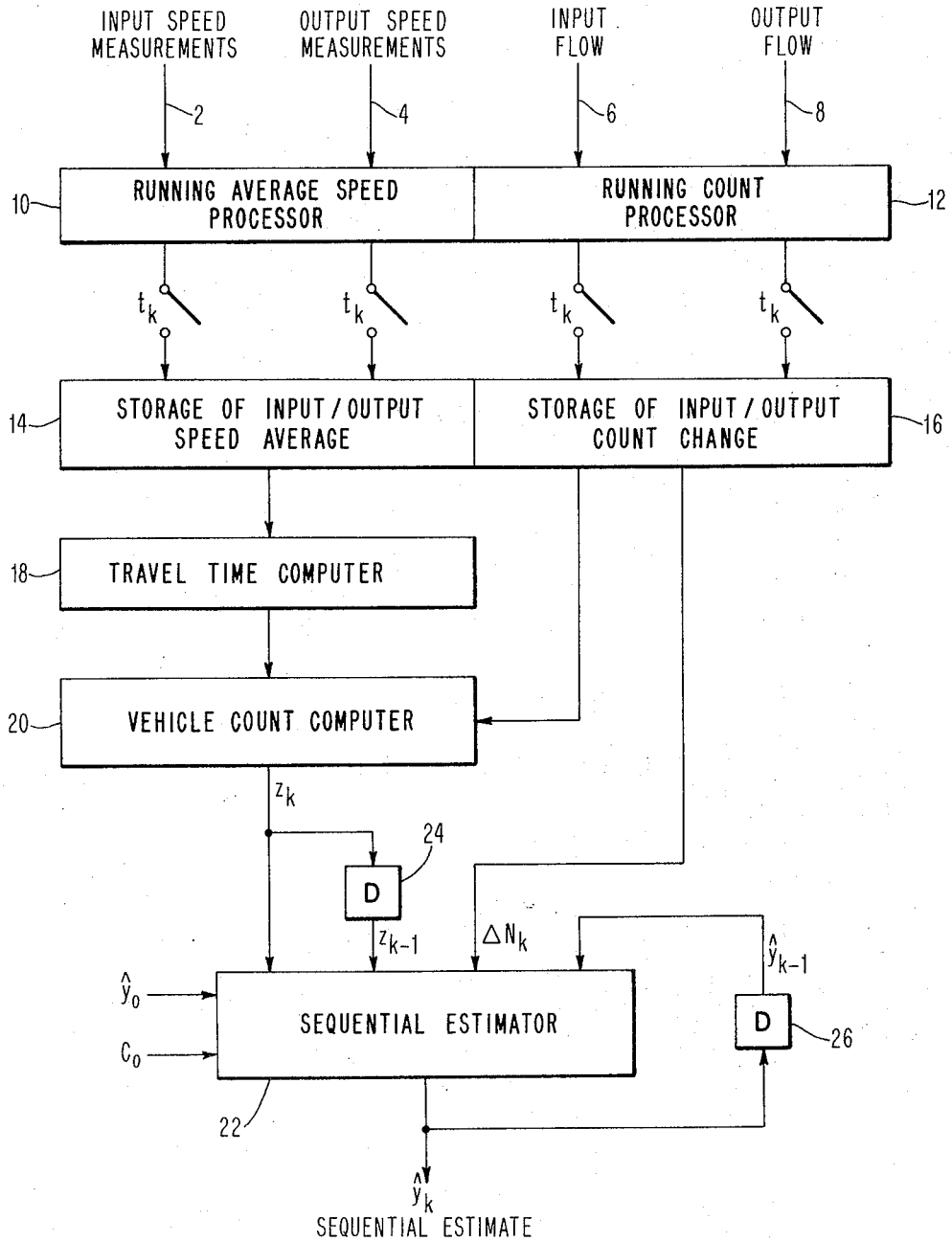
Figure 4:
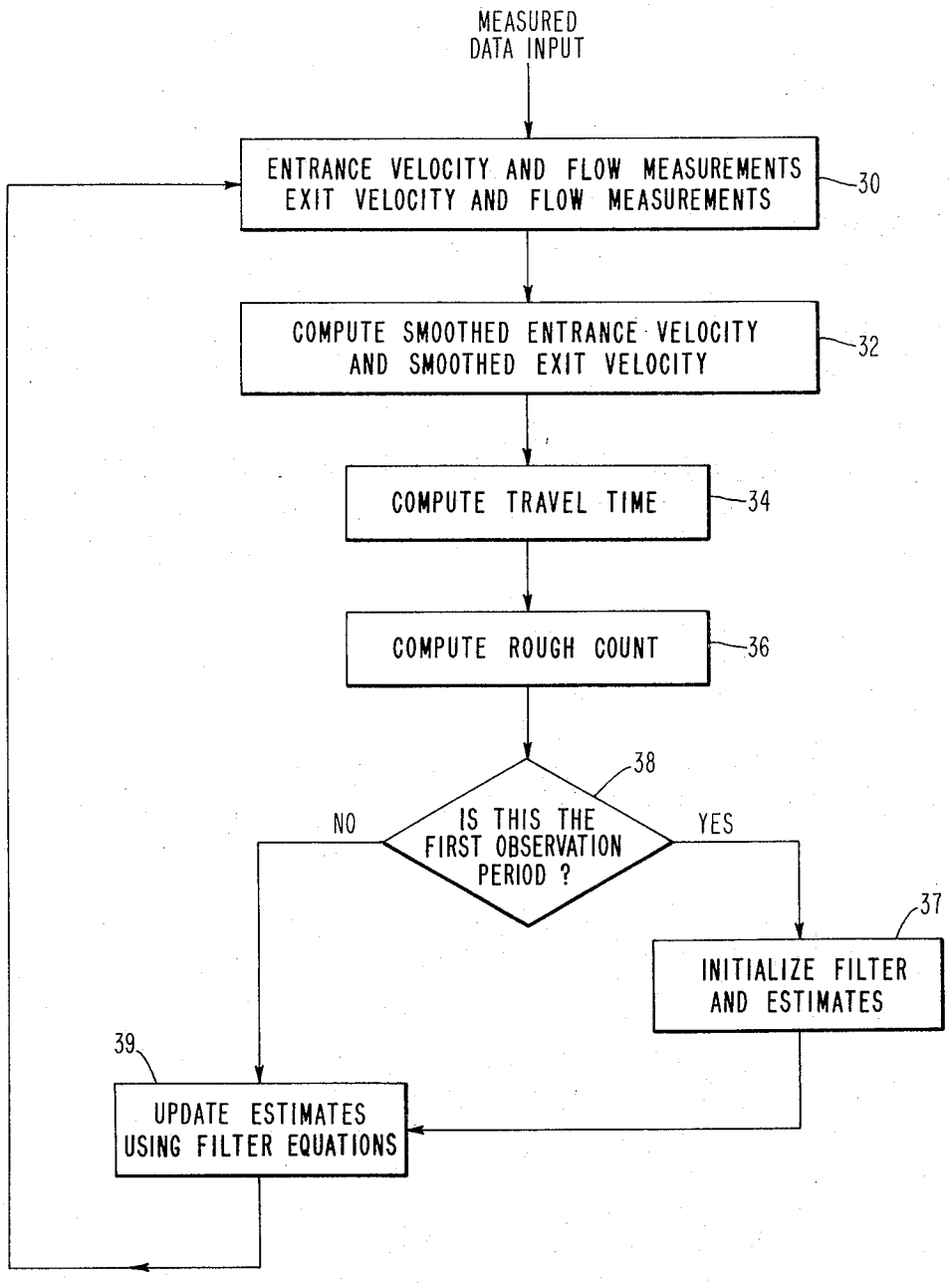
Figure 5:
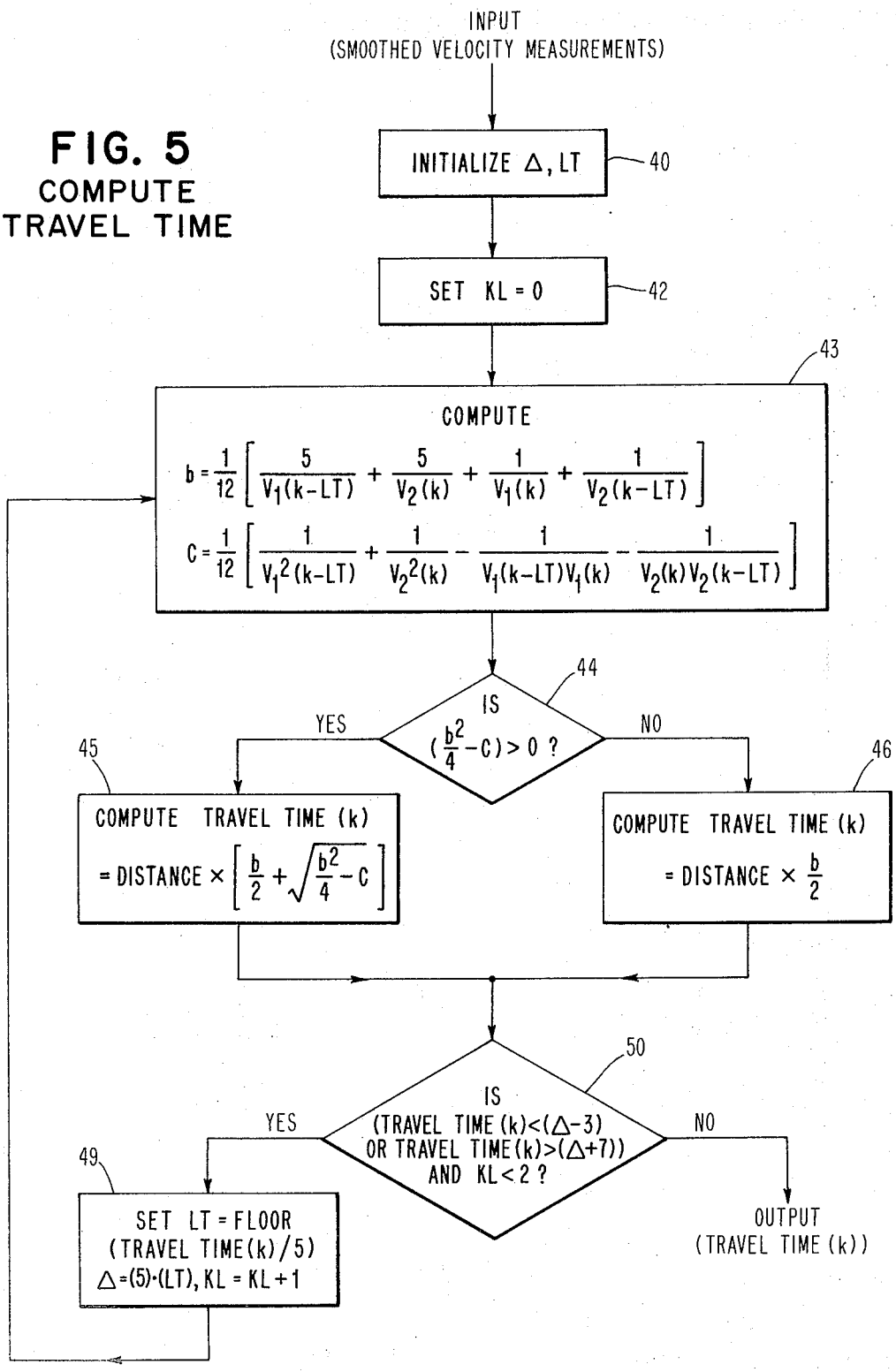
Figure 6:
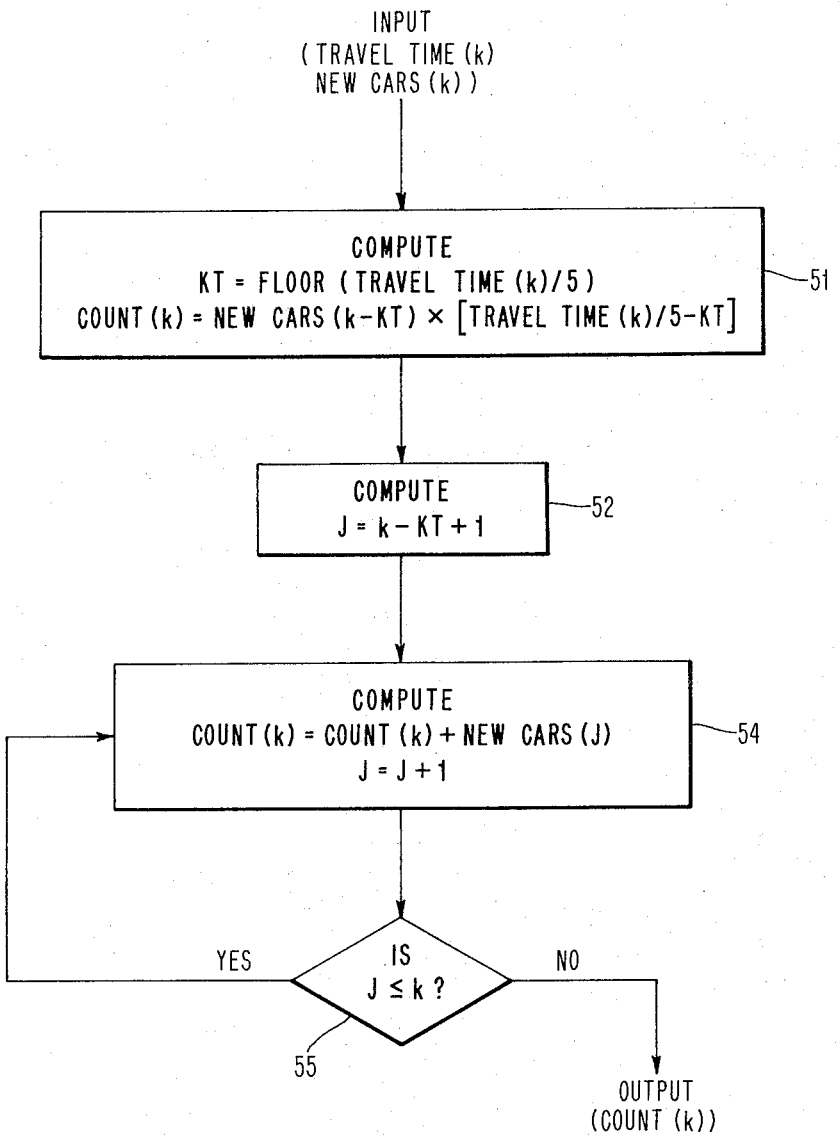

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 5, 1974

920 O.G. 10

T920,013

METHOD FOR ON-LINE ESTIMATION OF TRAFFIC DENSITY

Denos C. Gazis, Millwood, N.Y., and Charles H. Knapp, Willimentic, Conn., assignors to International Business Machines Corporation, Armonk, N.Y.

Continuation of abandoned application Ser. No. 180,274, Sept. 14, 1971. This application July 16, 1973, Ser. No. 379,673

Int. Cl. G06f *15/48*

U.S. Cl. 444—1

5 Sheets Drawing. 32 Pages Specification

ON LINE SEQUENTIAL ESTIMATION OF TRAFFIC FLOW DENSITY

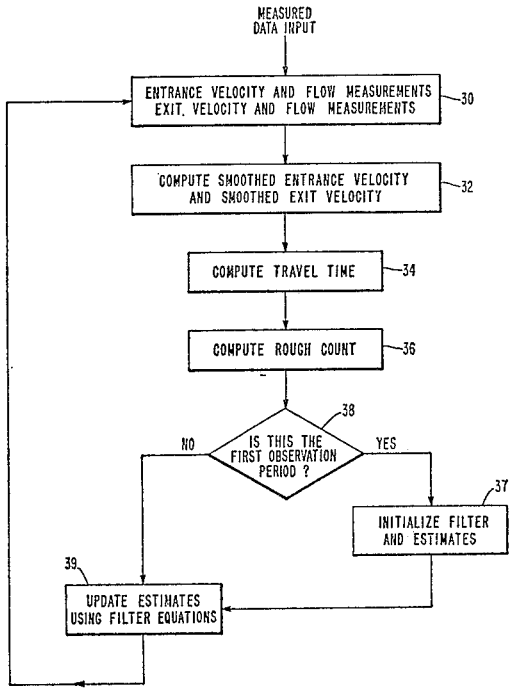

This is a method for automatically estimating the number of vehicles present on a section of roadway from measurements of speed and vehicle flow at the entrance and exit points of the roadway section. The method comprises the steps of computing rough count estimates of the number of vehicles in said roadway at regular intervals, referred to as observation periods, and then correcting these estimates by a sequential correction scheme which filters out random errors present in the count.

At both the entrance and exit points of the roadway, detector mechanisms monitor the number of passing vehicles and their respective velocities. For each observation period, the input and output velocities are averaged and an estimate of travel time over the roadway is computed. Then, a rough estimate of the number of vehicles in the roadway is computed from an inventory of vehicle arrivals at the input of said roadway and the travel time of exiting vehicles. The rough estimate is then adjusted by means of sequential estimator which utilizes the requirement that the count obtained at the end of two successive observation periods is equal to the number of cars present in the roadway at the prior observation period plus the difference between the number of vehicles entering and exiting the roadway during the present observation.

METHOD FOR ON-LINE ESTIMATION OF TRAFFIC DENSITY

Original Filed Sept. 14, 1971 5 Sheets-Sheet 1

TYPICAL VEHICLE TRAJECTORIES IN THE SPACE-TIME PLANE

NORMALIZED AUTOCORRELATION FUNCTIONS OF ERRORS IN THE ROUGH COUNTS OF VEHICLES

INVENTORS
DENOS C. GAZIS
CHARLES H. KNAPP

BY Victor Siber
ATTORNEY

METHOD FOR ON-LINE ESTIMATION OF TRAFFIC DENSITY

Original Filed Sept. 14, 1971 5 Sheets-Sheet 2

METHOD FOR ON-LINE ESTIMATION OF TRAFFIC DENSITY

Original Filed Sept. 14, 1971 5 Sheets-Sheet 3

ON LINE SEQUENTIAL ESTIMATION OF TRAFFIC FLOW DENSITY

COMPUTE
TRAVEL TIME

COMPUTE ROUGH COUNT